United States Patent [19]

Brazel

[11] Patent Number: 4,555,852
[45] Date of Patent: Dec. 3, 1985

[54] HAND DEVICE FOR DETERMINING VEHICLE POSITION

[76] Inventor: Jens Brazel, Richard-Wagner-Str. 62, 7310 Plochingen, Fed. Rep. of Germany

[21] Appl. No.: 491,164

[22] Filed: May 3, 1983

[30] Foreign Application Priority Data

May 3, 1982 [DE] Fed. Rep. of Germany ....... 3216322

[51] Int. Cl.$^4$ .............................................. B43L 9/22
[52] U.S. Cl. ...................................... 33/27 B; 33/150
[58] Field of Search ................. 33/27 R, 27 B, 143 R, 33/148 R, 148 E, 148 F, 149 R, 149 B, 150, 151, 153

[56] References Cited

U.S. PATENT DOCUMENTS

| 283,907 | 8/1883 | Low ...................................... 33/150 |
| 598,911 | 2/1898 | De Tray ................................. 33/150 |
| 1,396,417 | 11/1921 | Gepack .............................. 33/27 B |
| 1,901,801 | 3/1933 | Cattaneo ............................. 33/150 |
| 2,645,021 | 7/1953 | Dierkes ................................ 33/150 |
| 3,014,281 | 12/1961 | Caporicci ........................... 33/27 B |
| 4,163,322 | 8/1979 | Partes ................................ 33/27 B |

FOREIGN PATENT DOCUMENTS 2146881 3/1973 Fed. Rep. of Germany .
7927078 10/1980 Fed. Rep. of Germany .

Primary Examiner—Charles Frankfort
Assistant Examiner—Patrick R. Scanlon
Attorney, Agent, or Firm—Walter C. Farley

[57] ABSTRACT

A hand-held device for the determination of the momentary position of a vehicle, especially an airplane, moving at least approximately in a straight line and at about constant speed, has two compass legs each having a compass point and a lock movement having a drive shaft for driving at least one of the compass legs which is pivotable about a pivot pin. In order to largely eliminate the chord defect, the pivot pin of the drivable leg of the compass is movable in a straight line in a guide slot as a function of speed and the drive shaft moves the drivable leg as a function of time.

7 Claims, 4 Drawing Figures

HAND DEVICE FOR DETERMINING VEHICLE POSITION

This invention relates to a hand-held device which can be used for the determination of the instantaneous position of a vehicle, particularly an airplane.

BACKGROUND OF THE INVENTION

When using a compass to plan or plot a vehicle route on a flat map, there is a difference between the path covered by the points of the compass and the path travelled by the aircraft because the aircraft path follows a curve. This difference is sometimes referred to as the "chord defect". In an effort to compensate for this defect, a known hand device uses a non-circular pair of gear wheels. The movable point of the compass in this device rotates about a pivot point which is displaced relative to the axis of the compass leg carrying the other compass point, introducing an additional defect which cannot be compensated for in a simple fashion by the spiral, curve-like tooth arrangements of the two gears. Furthermore, the production of such gears is very expensive. This arrangement is shown in German OS No. 2146881.

In another prior art device, the chord defect is compensated by arranging the lengths of both legs of the compass so that the lengths are longer by a predetermined factor than the radius which mathematically corresponds in the case of certain open angles to the length of the circular arc pertaining to those angles. However, one cannot achieve compensation for the chord defect acting uniformly over the entire possible angular area as a result of this lengthening. This approach is shown in German Utility Pat. No. 7927078.

BRIEF DESCRIPTION OF THE INVENTION

An object of the present invention is to provide a compass apparatus which eliminates the chord defect by altering the pivot point as a function of the travel characteristics of the vehicle.

Briefly described, the invention comprises a hand-held device for determining the momentary position on a map of a vehicle moving in approximately a straight line and at a substantially constant speed across the surface of the earth comprising a housing; first and second compass legs each having a point, at least one of said legs being pivotable about a pivot pin; means defining an elongated slot fixed to said housing for receiving said pivot pin; and drive means having a drive shaft for pivotably driving said at least one of said legs about said pin without moving said leg longitudinally.

As a result of the guidance of the pivot pin for the drivable leg of the compass in a guide slot and by driving the drivable leg of the compass by means of a movement transverse to the slot guidance, it is possible to arrive at a distance between the points of the compass which equals the arc through which the movable point of the compass would pass whenever the driving shaft of the movement would, at the same time, be the pivot pin for the drivable leg.

In order that the manner in which the foregoing and other objects are attained in accordance with the invention can be understood in detail, a particularly advantageous embodiment thereof will be described with reference to the accompanying drawings, which form a part of this specification and wherein.

DETAILED DESCRIPTION OF THE PREFERRED EMBODIMENT

Figure 1:
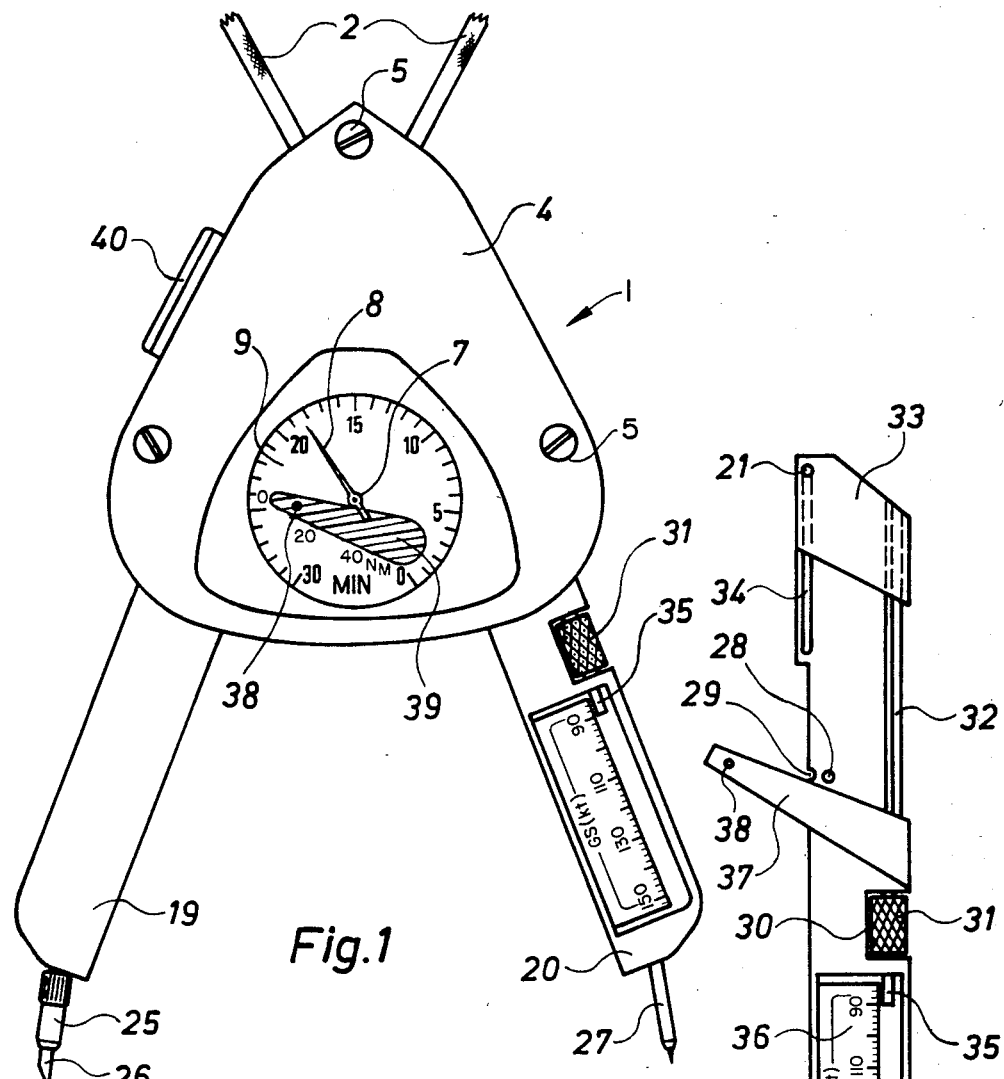
FIG. 1 is a front elevation of a compass incorporating the apparatus of the present invention.
Figure 2:
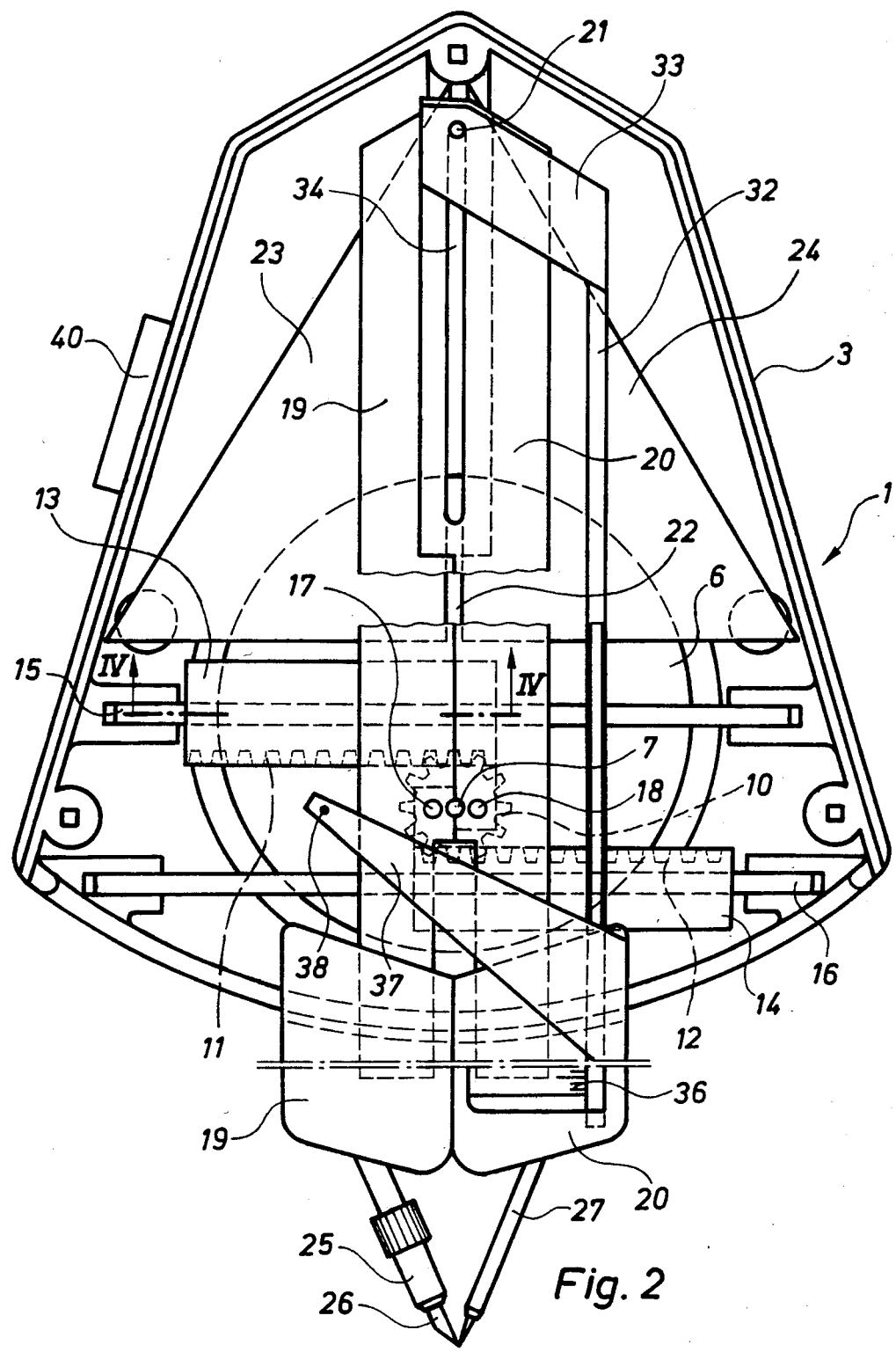
FIG. 2 is an enlarged, foreshortened front elevation, with the cover removed, of the apparatus of FIG. 1.

FIG. 1 shows a front elevation of a hand device indicated generally at 1 which can conveniently be carried around one's neck by a loop of string 2 which can be an elastic cord. As best seen in FIG. 2, the device itself includes a housing 3 which is closed by a cover 4, shown in FIG. 1 attached to the housing by screws 5, the cover being removed in FIG. 2.

As best seen in FIG. 2, the apparatus within housing 3 includes a movement 6 which operates as a driving motor and which can be, for example, a clockwork motor of a mechanical or electrical type which has an output shaft 7. An indicator needle 8 is mounted on shaft 7 for rotational movement with the shaft, the needle being positioned to cooperate with an instrument dial 9 attached to cover 4, which dial can be covered up by a disc, not shown. The shaft 7 of movement 6 can also protrude beyond the movement on the other side, in which case the dial can be exposed on that other side of the housing 3.

Figure 4:
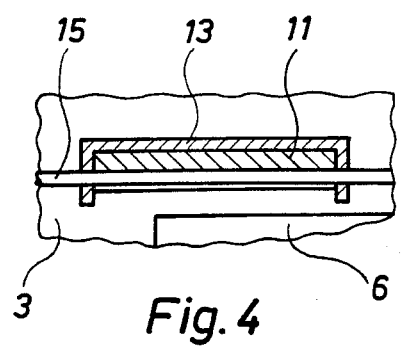
FIG. 4 is a bottom plan view, in section, along line IV—IV of FIG. 2.

A pinion 10 is fixedly attached to shaft 7 for rotation therewith, the teeth of pinion 10 being meshingly engaged with the teeth of elongated racks 11 and 12 which are mounted in parallel relationship on opposite sides of pinion 10 so as to be movable in opposite directions from each other in response to rotation of the pinion. Racks 11 and 12 are enclosed within carrier or driver members 13 and 14, respectively, which are shown in FIG. 2. The two carriers 13 and 14 are guided in guide rods 15 and 16, respectively, which are mounted within housing 3 and which are parallel to each other. As shown in FIG. 4, the carrier 13 is formed as a U-shaped member with rod 15 passing through the legs thereof. The carrier 13 generally surrounds rack 11 which has an inwardly extending groove or a longitudinal bore for receiving the rod 15. Rack 12, carrier 14 and bar 16 are formed in the same fashion. As seen in FIG. 2, the two carriers are provided with generally rectangular projections at one end thereof, the projection on each carrier extending toward the other carrier. The projections on carriers 13 and 14 are fixedly attached to pegs 18 and 17, respectively, which extend in the same direction toward the cover 4 of the apparatus. As will be recognized, the axis of the shaft 7 lies in the same plane as pegs 17 and 18, the plane being parallel with guide rods 15 and 16. As will also be recognized, the projections which carry pegs 17 and 18 advantageously lie in essentially the same plane which is parallel with cover 4.

The apparatus further comprises two compass legs 19 and 20 which are pivotable about a pivot pin 21 and each of the legs has a hole for receiving one of the pegs 17, 18. The pivot pin 21 is guided in a guide slot 22 which is located between two guide plates 23 and 24 which are fixedly mounted within housing 3. Guide slot 22 extends generally perpendicularly relative to guide rods 15, 16 and the length of the slot corresponds to the path of travel of pivot pin 21 which occurs when the compass legs 19 and 20 are spread from the closed position shown in FIG. 2 into the widest spread-open position such as shown in FIG. 1, this movement occurring as a result of the drive provided by movement 6. During the operation of movement 6, pinion 10 rotates and drives racks 11 and 13 in opposite directions, the racks carrying with them carriers 13, 14 and pegs 18, 17 which, since the pegs engage holes in the legs, drive the legs 19 and 20, respectively, to their spread positions.

Figure 3:
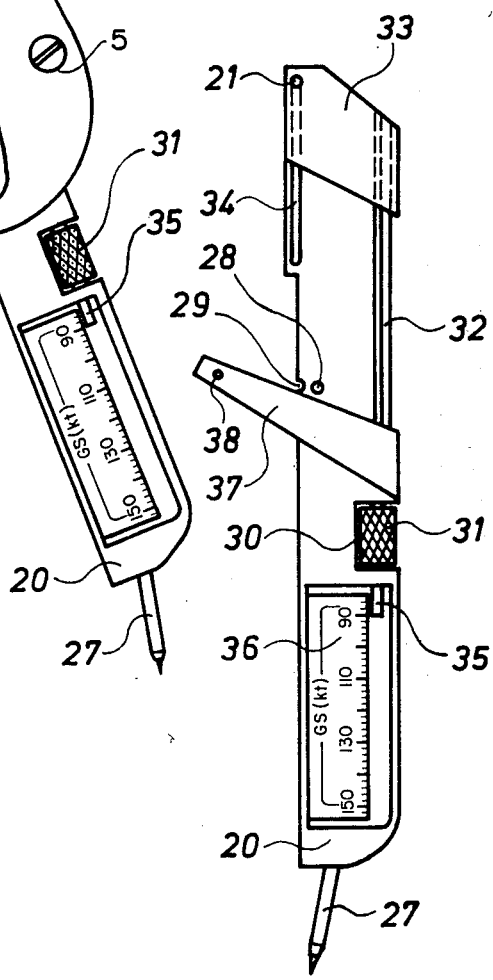
FIG. 3 is a front elevation of one leg of the compass apparatus shown in FIG. 1.

As shown in FIG. 1, legs 19, 20 protrude out of the housing 3 and carry at their free ends either a piece of pencil lead 26 disposed in a conventional support 25 or, on the other leg, a compass point 27. In FIG. 3, the compass leg 20 is shown by itself apart from the remainder of the apparatus. The hole in that leg for receiving peg 18 is identified as 28. The semi-circular recess 29 adjacent hole 28 serves to receive one-half of shaft 7 when the two compass legs are in their fully closed position (FIG. 2). Hole 28 is arranged as close as possible to recess 29.

Compass leg 20 has a recess 30 which receives a knurled nut 31 which, as will be described, serves as an adjusting member. Nut 31 is threadedly received on an elongated threaded rod 32 which extends along the side of leg 20 which faces away from leg 19. Threaded rod 32 carries a holder 33, also seen in FIG. 2, to which pivot pin 21 is fixedly attached. As will be recognized from FIG. 3, as nut 31 is rotated, and because nut 31 is restrained from axial movement, rod 32 moves longitudinally, carrying with it holder 33 and pin 21. As holder 33 moves downwardly, in the sense of the orientation shown in FIGS. 2 and 3, pin 21 also moves downwardly along an elongated slot 34 which is provided in a portion of leg 20, the elongated slot 34 being parallel with the axis of rod 32. Leg 19 also has an elongated slot corresponding to and aligned with slot 34 through which pin 21 protrudes. Thus, adjustment of rod 32 changes the positioning of the pivot point for both of legs 19 and 20, but the legs are not permitted to move longitudinally (downwardly in FIG. 2) because of their engagement with pegs 17 and 18, the movement of the pegs in that direction being inhibited.

As seen in FIGS. 1 and 3, the end of leg 20 remote from holder 33 is provided with a speed scale which has, as its indicator, the end 35 of threaded rod 32 or a mark provided on the rod. The speed of the vehicle thus indicated can be adjusted by rotating nut 31 and, thus, the position of pivot pin 21 relative to the two compass legs 19, 20 can be established as a function of the speed.

An indicator vane 37 is attached to compass leg 20 at a point on the leg just above nut 31, the vane in the closed position of compass legs 19, 20 extending across the other leg 19, the vane being provided with a mark 38. This mark cooperates with a distance scale 39 forming a part of dial 9, the scale having marked thereon the linear portions of a group or family of curves which provide a technique for indicating the distance covered by the vehicle. Because the indicator vane 37 is located within housing 3, distance scale 39 is attached on a transparent carrier which has a backing arranged so that indicator vane 37 is located between the carrier and the backup sheet.

A switch or starting lever 40 is provided to activate rotation of movement 6 and its output shaft 7.

Upon operation of switch 40, movement 6 begins to rotate pinion 10, and through the rack arrangement described, to spread the compass legs 19. If a speed of flight has previously been set by adjustment of nut 31, after the passage of an interval of time as indicated by needle 8 with respect to dial 9, it will be possible to determine the distance covered during that time and to identify the position of the airplane on a map having the path of travel drawn on a straight line by placing point 27 at the beginning position, point 26 then being at the location reached after that time. Prior to the flight, it is possible to determine the time and the path of the flight by setting the points of the compass onto the starting and landing positions, having first adjusted the speed of travel using nut 31. To the extent that the position after a certain time of flight is determined on the basis of a map, or from other sources, a correction to the actual speed of flight can be accomplished by turning nut 31 whenever the distance between the point 27 and pencil point 26 differs from the otherwise established path of travel as indicated on the map.

It is also possible to construct the apparatus such that only leg 20 of the compass is driven, leg 19 being fixedly attached to the housing 3. In that situation, it is possible to dispose the center of peg 18 in an extension of the axis of slot 34 wherein peg 18 and shaft 7 are displaced relative to each other in the axial direction as viewed with the legs in their closed position.

Also, instead of threaded rod 32, holder 33 and slot 34, leg 20 of the compass can consist of a threaded bar which is pivotable about pin 21 and is connected, as well, with pin 21 being rotatable about its own axis and the axis of a threaded pipe screwed onto the threaded rod, on which pipe peg 18 is disposed. The axial position of the threaded rod relative to the piece of pipe is a measure for the adjusted speed of flight.

While certain advantageous embodiments have been chosen to illustrate the invention, it will be understood by those skilled in the art that various changes and modifications can be made therein without departing from the scope of the invention as defined in the appended claims.

What is claimed is:

1. A hand-held device for determining the momentary position on a map of a vehicle moving in approximately a straight line and at a substantially constant speed across the surface of the earth comprising
    a housing;
    first and second compass legs each having a point, said legs being pivotable about a pivot pin;
    means defining an elongated slot fixed to said housing for receiving said pivot pin;
    drive means having a drive shaft for pivotably driving said legs about said pin without moving said legs longitudinally, said drive means including
        a toothed rack;
        means for guiding said rack along a line perpendicular to said slot;
        a pinion engaging said rack and drivingly coupled to said drive shaft;
        a drive peg attached to said rack and engaging one of said pivotable legs between said pivot pin and the point on said one pivotable leg;
        a second rack engaging said pinion;
        means for guiding said second rack along a line perpendicular to said slot; and
        a second drive peg attached to said second rack and engaging the other leg; and
    means for adjusting the position of said pivot pin along said slot and along said one pivotable leg as a function of flight speed, said means including
        an elongated longitudinally adjustable member;

means fixedly attached to one end of said member and to said pivot pin;
means defining an elongated slot carried by said one pivotable leg for slidably receiving said pivot pin; and
a speed scale adjacent said member.

2. A device according to claim 1 wherein said elongated member extends along said one leg and includes a threaded portion, said means for adjusting further including
a rotatable nut threadedly engaging said threaded portion; and
means for restraining said nut against axial movement.

3. A device according to claim 2 and including
a distance scale; and
means including an indicator mark carried by said one pivotable leg, said mark being movable along said scale as said leg pivots.

4. A device according to claim 3 wherein said distance scale comprises a family of essentially straight parallel lines.

5. A device according to claim 4 and including a carrier fixedly attached to each said rack; and
a guide rod for guiding the movement of each said carrier,
one of said drive pegs being carried by each of said carriers, said pegs lying in a plane containing said drive shaft and parallel with said guide rod.

6. A hand-held device for determining the momentary position on a map of a vehicle moving in approximately a straight line and at a substantially constant speed across the surface of the earth comprising
a housing;
first and second compass legs each having a point, at least one of said legs being pivotable about a pivot pin;
means defining an elongated slot fixed to said housing for receiving said pivot pin;
drive means having a drive shaft for pivotably driving said at least one of said legs about said pin without moving said leg longitudinally, said drive means including
a toothed rack;
means for guiding said rack along a line perpendicular to said slot,
a pinion engaging said rack and drivingly coupled to said drive shaft, and
a drive peg attached to said rack and engaging said at least one of said legs between said pivot pin and the point on said at least one of said legs; and
means for adjusting the position of said pivot pin along said slot and along said at least one pivotable leg as a function of flight speed, said means including
an elongated logitudinally adjustable member;
means fixedly attached to one end of said member and to said pivot pin;
means defining an elongated slot carried by said at least one pivotable leg for slidably receiving said pivot pin; and
a speed scale adjacent said member.

7. A hand-held device for determining the momentary position on a map of a vehicle moving in approximately a straight line and at a substantially constant speed across the surface of the earth comprising
a housing;
first and second compass legs each having a point, at least one of said legs being pivotable about a pivot pin;
means defining an elongated slot fixed to said housing for receiving said pivot pin;
drive means having a drive shaft for pivotably driving said at least one of said legs about said pin without moving said leg longitudinally; and
means for adjusting the position of said pivot pin along said slot and along said at least one pivotable leg as a function of flight speed, said means including
an elongated longitudinally adjustable member;
means fixedly attached to one end of said member and to said pivot pin;
means defining an elongated slot carried by said at least one pivotable leg for slidably receiving said pivot pin; and
a speed scale adjacent said member.

* * * * *